United States Patent
Bao et al.

(10) Patent No.: US 9,104,305 B2
(45) Date of Patent: *Aug. 11, 2015

(54) CONTROLLING A CURSOR ON A TOUCH SCREEN

(71) Applicant: International Business Machines Corporation, Armonk, NY (US)

(72) Inventors: Sheng Hua Bao, Yorktown Heights, NY (US); Jian Chen, Beijing (CN); Chengen Lu, Beijing (CN); Rui Ma, Beijing (CN); Zhong Su, Beijing (CN); Rui Wang, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/924,737

(22) Filed: Jun. 24, 2013

(65) Prior Publication Data

US 2014/0002393 A1    Jan. 2, 2014

(30) Foreign Application Priority Data

Jun. 29, 2012  (CN) .......................... 2012 1 0226425

(51) Int. Cl.
*G06F 3/0488* (2013.01)
*G06F 3/041* (2006.01)

(52) U.S. Cl.
CPC ............ *G06F 3/0488* (2013.01); *G06F 3/0414* (2013.01)

(58) Field of Classification Search
CPC ... G06F 3/0488; G06F 3/0481; G06F 3/0484; G06F 3/041

USPC .................. 345/156, 173–178, 157, 159, 160
See application file for complete search history.

(56) References Cited

U.S. PATENT DOCUMENTS

| | | | |
|---|---|---|---|
| 6,278,443 B1 * | 8/2001 | Amro et al. ................... | 345/173 |
| 6,727,892 B1 * | 4/2004 | Murphy ........................ | 345/173 |
| 7,605,804 B2 * | 10/2009 | Wilson .......................... | 345/173 |
| 7,640,518 B2 * | 12/2009 | Forlines et al. ............... | 715/863 |
| 8,643,616 B1 * | 2/2014 | Zhang et al. .................. | 345/173 |
| 2005/0110745 A1 * | 5/2005 | Rutledge et al. .............. | 345/156 |
| 2008/0180402 A1 * | 7/2008 | Yoo et al. ...................... | 345/173 |
| 2008/0204419 A1 * | 8/2008 | Grothe .......................... | 345/173 |
| 2010/0007612 A1 * | 1/2010 | Locker et al. ................. | 345/173 |
| 2010/0207904 A1 * | 8/2010 | Kolmykov-Zotov et al. . | 345/173 |
| 2011/0006983 A1 * | 1/2011 | Grothe .......................... | 345/157 |
| 2011/0169749 A1 | 7/2011 | Ganey et al. | |
| 2011/0242042 A1 * | 10/2011 | Xu ................................. | 345/174 |
| 2012/0007805 A1 | 1/2012 | Kim | |
| 2012/0044164 A1 * | 2/2012 | Kim et al. ...................... | 345/173 |
| 2012/0113053 A1 * | 5/2012 | Cato .............................. | 345/174 |
| 2013/0335337 A1 * | 12/2013 | Chua et al. .................... | 345/173 |

* cited by examiner

*Primary Examiner* — Seokyun Moon
*Assistant Examiner* — Josemarie G Acha, III
(74) *Attorney, Agent, or Firm* — Cantor Colburn LLP

(57) ABSTRACT

In one embodiment, a method for controlling a cursor on a touch screen includes, in response to having entered a pointing mode, displaying the cursor on the touch screen; in response to a touch on the touch screen, calculating a movement velocity of a touch point of the touch; and controlling the movement of the cursor according to the movement velocity of the touch point; wherein at any moment in the pointing mode, an input area of the touch point is any area within the touch screen.

2 Claims, 7 Drawing Sheets

CONTROLLING A CURSOR ON A TOUCH SCREEN

PRIORITY

This application claims priority to Chinese Patent Application No. 201210226425.5, filed Jun. 29, 2012, and all the benefits accruing therefrom under 35 U.S.C. §119, the contents of which in its entirety are herein incorporated by reference.

BACKGROUND

Embodiments of the present invention relate to data input, and more specifically, to a method, apparatus and related computer program product for controlling a cursor on a touch screen.

Data input is a significant aspect for implementing interactions between users and computing devices, and users may input data using a keyboard, a mouse, a stylus, and the like. In the field of pointing devices, there are various pointing devices supporting data input, such as a mouse, a touchpad, a joystick, a trackball, etc. These pointing devices can support a user to interact with a graphical user interface provided on a computing device. However, these pointing devices are typically individual external devices and need to occupy an additional space, so they are not quite suitable for portable computing devices or those computing devices on which the installation of a pointing device is spatially limited.

The emergence of a touch screen enables input for a user by using his/her own finger/stylus without the need to install an additional pointing device. However, the user needs to touch the screen within the entire scope of the touch screen, so as to move an input focus to any desired location on the touch screen. However, when using a computing device with a touch screen, the user usually needs to hold the computing device with one hand, while touching the surface of the touch screen and controlling the input focus with the other hand. At this point, when the touching hand is spatially limited or, for example, the user is a physically challenged one, then it is difficult for the user to touch the touch screen across the entire scope. In another example, when a size of the touch screen used by the user is quite large (e.g., more than 50 inches), then the user needs to move his/her arm(s) for a large distance so as to move from one side of the touch screen to the other side. Therefore, these problems limit the use of touch screens.

SUMMARY

In one embodiment, a method for controlling a cursor on a touch screen includes, in response to having entered a pointing mode, displaying the cursor on the touch screen; in response to a touch on the touch screen, calculating a movement velocity of a touch point of the touch; and controlling the movement of the cursor according to the movement velocity of the touch point; wherein at any moment in the pointing mode, an input area of the touch point is any area within the touch screen.

In another embodiment, an apparatus for controlling a cursor on a touch screen includes a display module configured to, in response to having entered a pointing mode, display the cursor on the touch screen; a calculating module configured to, in response to a touch on the touch screen, calculate a movement velocity of a touch point of the touch; and a control module configured to control the movement of the cursor according to the movement velocity of the touch point; wherein at any moment in the pointing mode, an input area of the touch point is any area within the touch screen.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated in a schematic instead of a limited manner. In the drawings.

DETAILED DESCRIPTION

Figure 1:
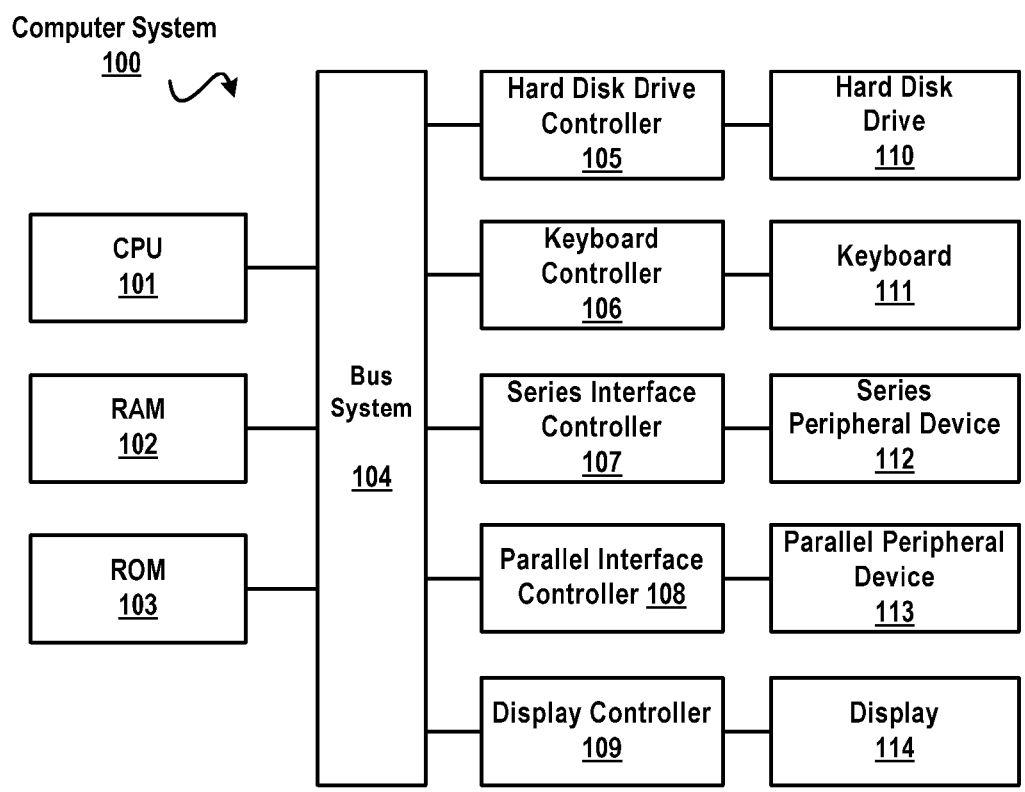
FIG. 1 illustrates an exemplary computer system which is applicable to implement the embodiments of the present invention.

In view of the above, it is desired to develop a technical solution that may achieve, simply by touching the touch screen at any area, the same technical effect as performing input across the whole touch screen area. To this end, the embodiments of the present invention provide a method and apparatus for controlling a cursor on a touch screen.

In one embodiment of the present invention, there is provided a method for controlling a cursor on a touch screen. The method comprises: in response to having entered a pointing mode, displaying the cursor on the touch screen; in response to a touch on the touch screen, calculating a movement velocity of a touch point of the touch; and controlling the movement of the cursor according to the movement velocity of the touch point; wherein at any moment in the pointing mode, an input area of the touch point is any area within the touch screen.

In one embodiment of the present invention, wherein the controlling the movement of the cursor according to the movement velocity of the touch point comprises: determining a location of the cursor according to the movement velocity of the touch point of the touch; and refreshing the cursor at the location.

In one embodiment of the present invention, there is further comprised: calculating touch force of the touch; and determining the location of the cursor based on the touch force.

In one embodiment of the present invention, there is provided an apparatus for controlling a cursor on a touch screen according to one embodiment of the present invention. The apparatus comprises: a display module configured to, in response to having entered a pointing mode, display the cursor on the touch screen; a calculating module configured to, in response to a touch on the touch screen, calculate a movement velocity of a touch point of the touch; and a control module configured to control the movement of the cursor according to the movement velocity of the touch point; wherein at any moment in the pointing mode, an input area of the touch point is any area within the touch screen.

In one embodiment of the present invention, the control module comprises: a determining module configured to determine a location of the cursor according to the movement velocity of the touch point of the touch; and a refreshing module configured to refresh the cursor at the location.

In one embodiment of the present invention, there is further comprised: a force module configured to calculate touch force of the touch; and a force control module configured to control the movement of the cursor based on the touch force.

By means of the method and apparatus of the present invention, the cursor may be displayed on the touch screen to indicate a current input focus, and any area on the touch screen may be used as an input area where a control signal is inputted to control the movement of the cursor, without a need for an external input device. In the meanwhile, the movement span of the user's finger/stylus may be reduced, which further facilitates the use for physically challenged users.

Exemplary embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further note that FIG. 1 schematically illustrates only an example of the exemplary computer system which is applicable to implement the embodiments of the present invention. Those skilled in the art should understand that the embodiments of the present invention may further be implemented on various computing devices with a touch screen, including, without limitation, a panel computer, a mobile communication terminal, an smart communication terminal, a media play terminal, a game terminal, a personal digital assistant, a terminal of the Global Positioning System, and other stationary or movable computing devices with a touch screen.

For a conventional touch screen such as a smart communication terminal, a panel computer and the like, it differs from an ordinary computing device (e.g., a laptop computer without a touch screen function) in that no cursor (e.g., a gesture indicator or an arrow indicative of an input focus, etc.) is displayed on a touch screen display, instead, the input focus is a location where the user's finger/stylus touches.

Figure 2:
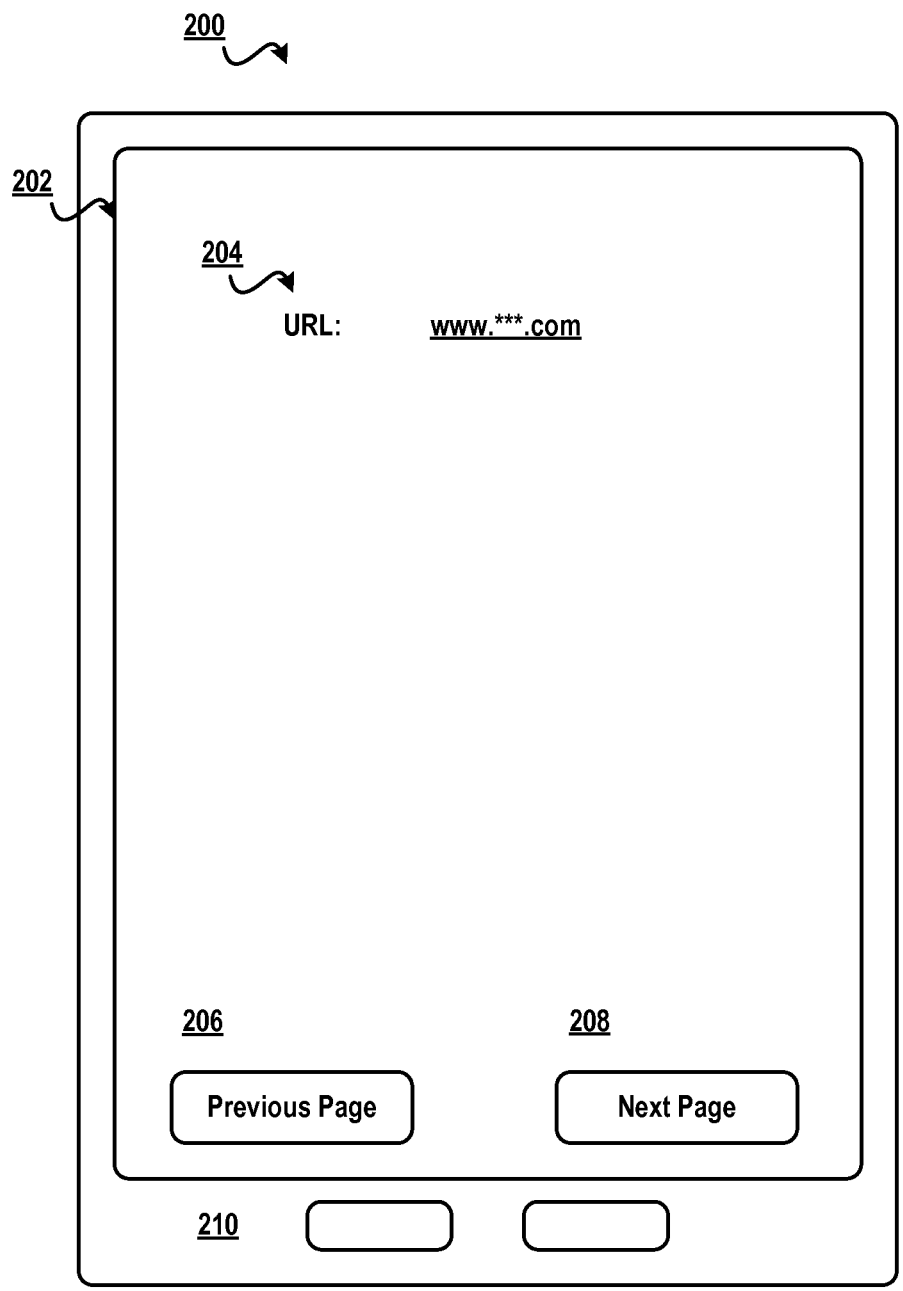
FIG. 2 schematically illustrates a schematic view of a touch screen in a normal usage mode.

FIG. 2 schematically illustrates a schematic view 200 of a touch screen in a normal usage mode. FIG. 2 schematically illustrates a plurality of controls displayed on a touch screen 202, such as a link 204 and buttons 206, 208. In addition, a hardware button 210 may further be disposed on the computing device. When the user wants to open the link 204, he/she needs to move his/her finger/stylus to the link 204 and click on this link; when the user wants to press the button 206, he/she needs to move his/her finger/stylus to the button 206 and then click on this button.

If there is a relatively long distance between a next input focus the user desires and the current user's finger/stylus, then the user has to span his/her arm over a relatively large space so as to move the finer/stylus to the desired location. At this point, such a long span action means a heavy burden on the user who is physically challenged.

Figure 3:
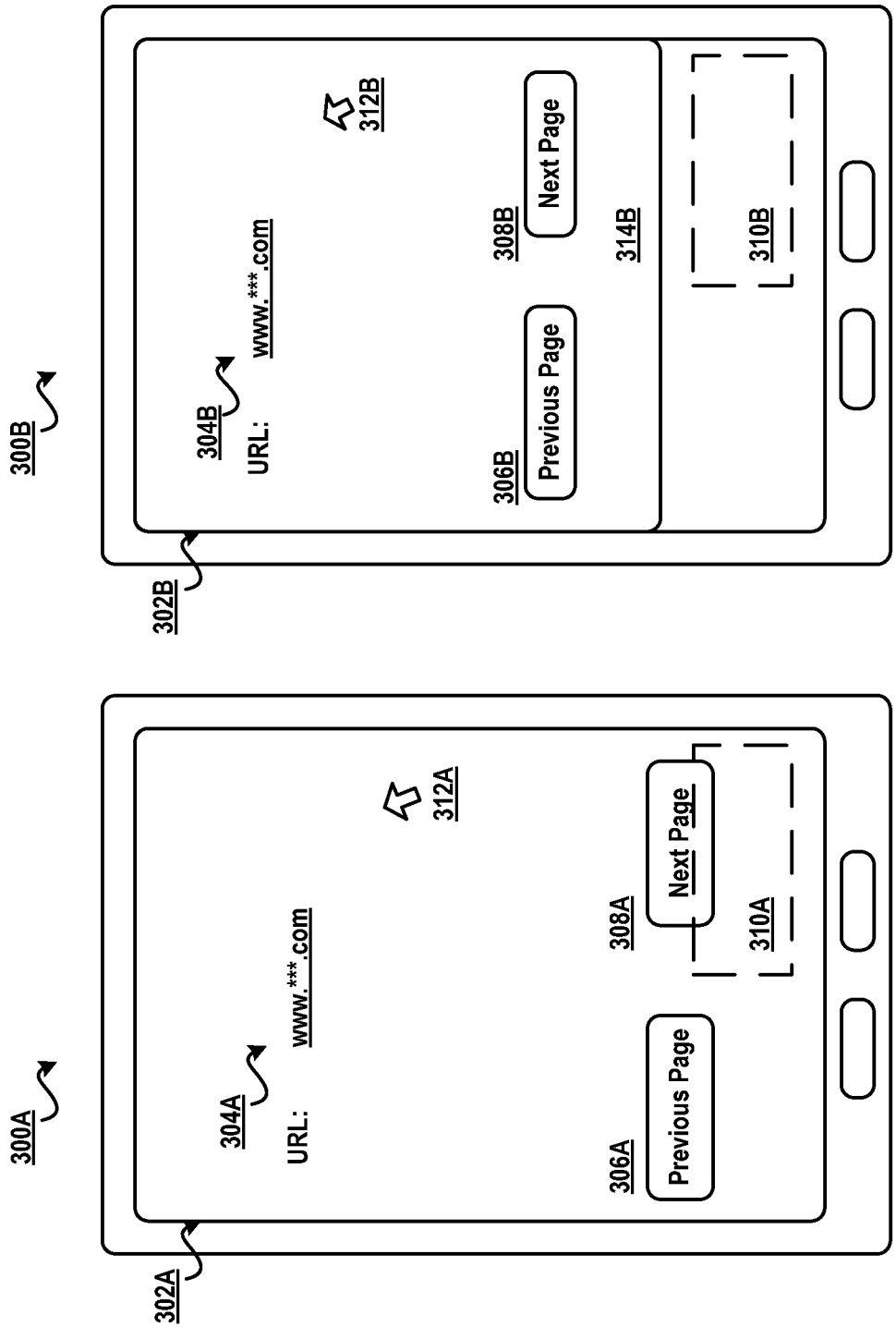
FIGS. 3A and 3B schematically illustrate schematic views of controlling a cursor on a touch screen according to some technical solutions, respectively.

FIGS. 3A and 3B schematically illustrate schematic views 300A and 300B of controlling a cursor on a touch screen according to some technical solutions, respectively. As illustrated in FIG. 3A, within a display area of a touch screen 302A there are comprised various controls, such as a link 304A and buttons 306A, 308A. In the technical solution illustrated in FIG. 3A, additionally there are provided a cursor 312A which is for representing a current input focus in the touch screen 302A, and a virtual touchpad 310A. The virtual touchpad 310A functions to allot a separate area for input in the display area of the touch screen 302A. When the user's finger/stylus moves within the virtual touchpad 310A, the cursor 312A may be controlled to move in the whole touch screen 302A.

However, the foregoing solution has a drawback that the overlap of regular displayed contents on the virtual touchpad 310A with the touch screen 302A (in FIG. 3A, for example, the displays of the virtual touchpad 310A and the button 308A overlap) makes it difficult to distinguish these regular displayed contents.

FIG. 3B illustrates another solution in which the whole display area of a touch screen 302B is divided into an upper display area 314B and a lower virtual touchpad 310B. By separating the display area 314B from the virtual touchpad 310B, it is possible to solve the display overlapping problem in the technical solution illustrated in FIG. 3A. In this way, although regular displayed contents will not overlap with contents on the virtual touchpad 310B, the display area 314B is downsized, which makes it impossible to effectively use the display space of the whole touch screen and further causes a problem that contents cannot be displayed in a conventional proportion.

Therefore, how to perform data input on a touch screen in a more friendly manner becomes a problem requiring an urgent solution. In order to enable a user to perform data input on a touch screen more conveniently and flexibly, the embodiments of the present invention provide a method, apparatus and related computer program for controlling a cursor on a touch screen.

In one embodiment of the present invention, there is provided a method for controlling a cursor on a touch screen, the method comprising: in response to having entered a pointing mode, displaying the cursor on the touch screen; in response to a touch on the touch screen, calculating a movement velocity of a touch point of the touch; and controlling the movement of the cursor according to the movement velocity of the touch point; wherein at any moment in the pointing mode, an input area of the touch point is any area within the touch screen.

It should be noted that in one embodiment of the present invention, a location of the cursor may differ from a location of the touch point. The user's finger/stylus may move within only a relatively small scope of the touch screen (e.g., at the lower right corner of the touch screen), while the cursor is controlled to move within the whole touch screen.

By means of the method according to the present invention, it is possible to separate a display location of the cursor from an input location of the user's finger/stylus, and moreover, to support the user to take any area on the touch screen as an input area controlling the cursor's location. By means of the embodiments of the present invention, the user no longer needs to install a separate external input device or confine the input area within a predefined area, so that a more friendly data input approach is provided.

Figure 4:
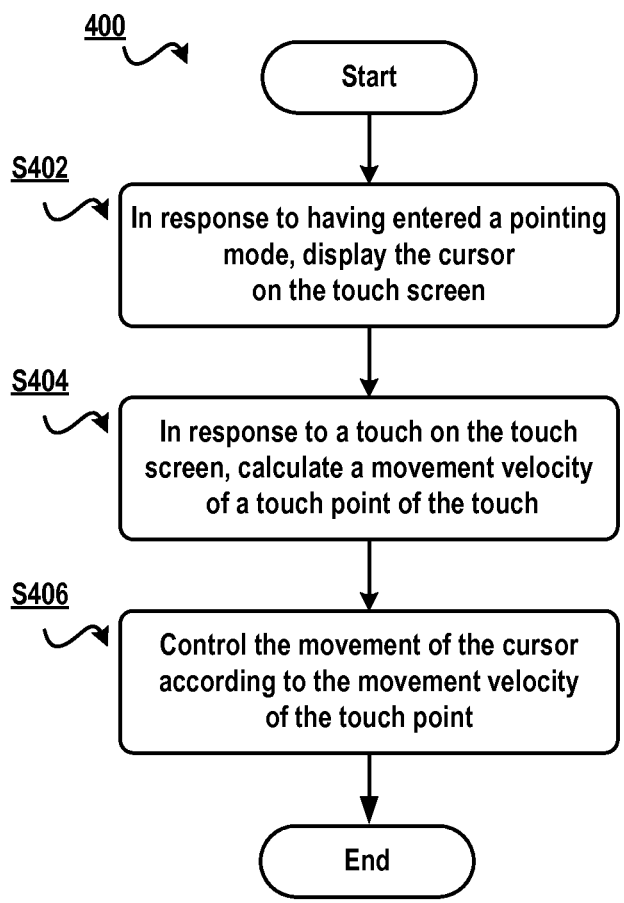
FIG. 4 schematically illustrates a flowchart of a method for controlling a cursor on a touch screen according to one embodiment of the present invention.

FIG. 4 schematically illustrates a flowchart 400 of a method for controlling a cursor on a touch screen according to one embodiment of the present invention. First of all, in response to having entered a pointing mode, the cursor is displayed on the touch screen in operation S402. An initial display location of the cursor may be specified; for example, the cursor may be displayed at the center of the touch screen, or the cursor may be displayed at other location according to the user's special demands. In view of the object of the present invention, the initial location of the cursor should be away from an operative area of the touch point. In one embodiment of the present invention, when the pointing mode is initiated, the cursor may be displayed at a location of a control illustrated in a touch screen display. For example, the cursor is displayed at one of the link 204 and the buttons 206, 208 illustrated in FIG. 2, so as to facilitate user operation.

It should be noted that the "pointing mode" mentioned in the context of the present invention is an operation mode relative to a "normal mode" (a normal operation mode of the touch screen). One of the two operation modes is in an active state, while the other is in an inactive state. It should be noted that at any moment in the pointing mode, an input area of the touch point is any area within the touch screen.

In response to a touch on the touch screen, a movement velocity of the touch point of the touch is calculated in operation S404. In the pointing mode, when the user touches the touch screen, a location of the cursor differs from a location of the touch point. That is, at this point the cursor and the touch point are separated from each other, and locations of both the cursor and the touch point may be any locations within the touch screen.

In operation S406, the movement of the cursor is controlled according to the movement velocity of the touch point. In this operation, the cursor will move as the touch point moves between the user's finger/stylus and the touch screen; that is, the cursor and the touch point move in the same direction at a corresponding speed.

By means of the technical solution described above, upon entering the pointing mode, the cursor may be displayed, for example, at the center of the display screen. At this point, when the user touches the touch screen once again, the cursor (i.e., the input focus) will move, driven by the user's touch; moreover, the user may take the whole area of the display screen as the "touchpad" for controlling the cursor. In this way, even when the user's finger cannot reach the whole touch screen area, it is possible to control the cursor to point at any desired location by moving the finger/stylus within any area of the touch screen. By means of this technical solution, the user's reliance on a dedicated input device may be reduced on the one hand; and on the other hand, convenient is provided to some physically challenged users to user touch screens while decreasing the range of body movement as much as possible.

In one embodiment of the present invention, the controlling the movement of the cursor according to the movement velocity of the touch point comprises: determining a location of the cursor according to the movement velocity of the touch point of the touch; and refreshing the cursor at the location. It should be noted that in this embodiment the "velocity" is a vector: the movement direction of the cursor is the movement direction of the touch point, and the movement speed of the cursor is in direct positive proportion to the movement speed of the touch point.

In one embodiment of the present invention, the entering the pointing mode comprises entering the pointing mode in response to one of: the track of the touch point satisfying a first predefined track; and pressing a first predefined button for initiating the pointing mode.

It should be noted that the user may use various manners for entering the pointing mode. For example, the user may touch the surface of the touch screen in the normal mode, and when the track of the touch point satisfies a predefined track (e.g., a circle, a triangle or other predefined shape), the user then enters the pointing mode. In one embodiment, techniques such as motion track analysis may be used to compare whether the track inputted by the user is matched to the predefined track, which is not detailed in this specification. In the pointing mode, the cursor will be displayed, and the user's touch to the touch screen will be used as an input controlling the cursor.

In addition, the user may press a predetermined button to enter the pointing mode. It should be noted that the "button" here may be a real button (e.g., the hardware button 210 illustrated in FIG. 2) disposed in the computing device having a touch screen, and may further be a virtual button (e.g., like the button control 206 illustrated in FIG. 2) displayed on the touch screen.

In one embodiment of the present invention, a first predefined track is defined by the user. The user may customize when which track is formed at the surface of the touch screen the pointing mode is initiated. That is, the user may customize a track for initiating the pointing mode, according to his/her own habits. For example, the user may prerecord a track of touching the touching screen, e.g., a first track. When the user operates in the normal mode, the user's touch track is analyzed. If the touch track is matched to the first track, then the pointing mode is entered; otherwise, the normal mode is retained.

Figure 5:
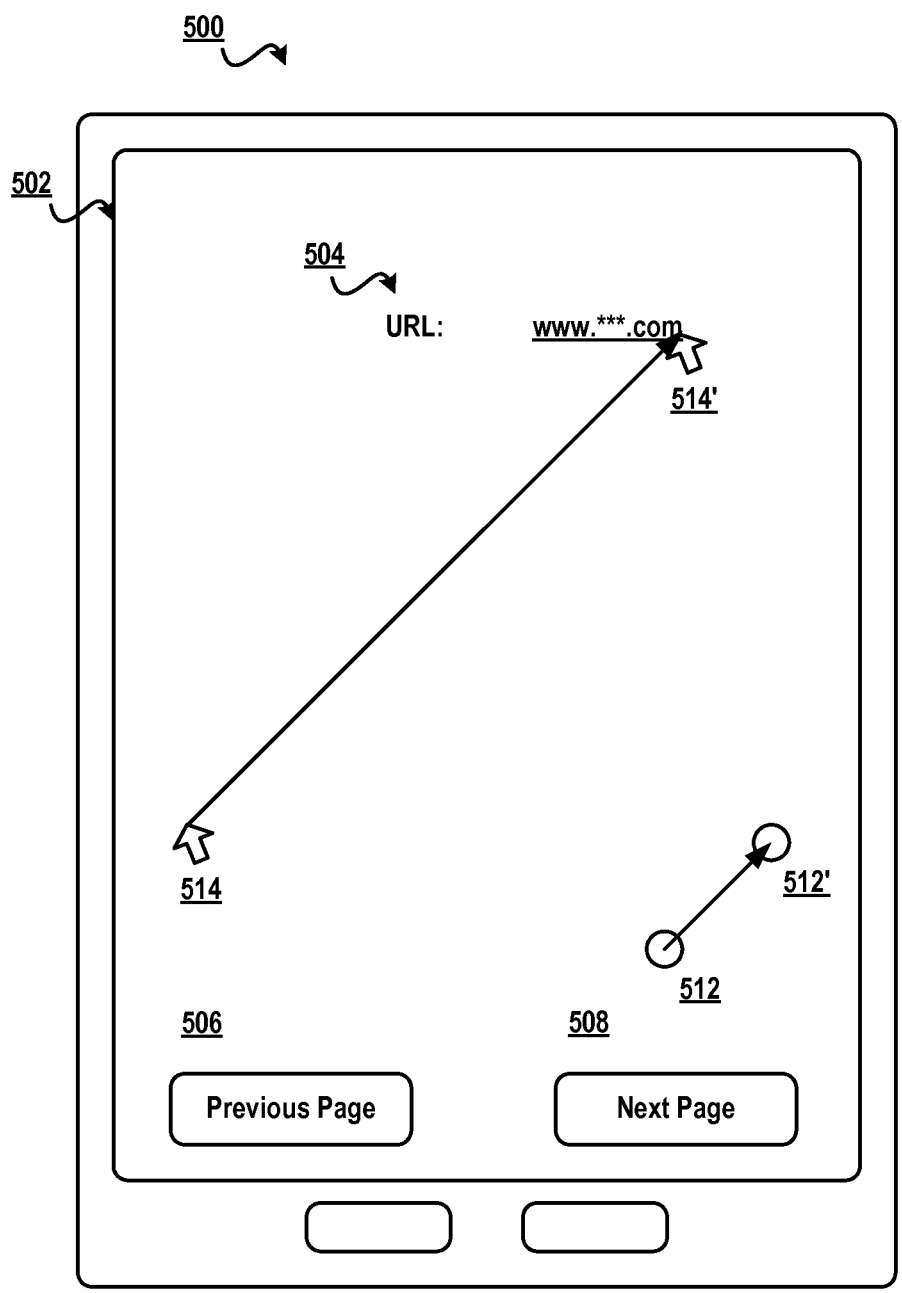
FIG. 5 schematically illustrates a method for controlling a cursor on a touch screen according to one embodiment of the present invention.

FIG. 5 schematically illustrates a schematic view 500 of a method for controlling a cursor on a touch screen according to one embodiment of the present invention. As illustrated in FIG. 5, controls such as a link 504, buttons 506 and 508 are displayed on a touch screen 502. At this point, the computing device has entered the pointing mode, so the cursor is additionally displayed on the touch screen. A starting location of the cursor is denoted as 514. When the user's finger/stylus moves between locations 512 and 512' in a direction as illustrated by an arrow, the cursor will move from the starting location 514 to a target location 514'.

It should be noted that FIG. 5 merely schematically illustrates one embodiment for controlling a cursor on a touch screen, and the locations 512 and 512' of the touch point are also schematic. The user may touch any location within the scope of the touch screen 502 and controls the cursor to move in a manner corresponding to a movement velocity of the user's finger/stylus.

In one embodiment of the present invention, in response to having clicked on the touch screen, an item is activated which is displayed on the touch screen and at which the cursor points. In this embodiment, the "items" may be various controls displayed on the touch screen, such as a link, a button, a list, a select box, etc. When the user moves the cursor to a desired location, he/she may click on any location of the touch screen with his/her finger/stylus, to achieve the same effect as clicking on a mouse at an input focus on an ordinary computer. For example, when the cursor has moved to 514', the user may click on any location of the touch screen, at which point contents displayed on the touch screen 502 will be directed from a current page to a page of the link www.*.com. For another example, when the cursor has moved to the button 506, the user may click on any location of the touch screen, at which point contents displayed on the touch screen 502** will be directed to a page corresponding to the "previous page."

In one embodiment of the present invention, a touch force of the touch is calculated, and the movement of the cursor is controlled based on the touch force. Another innovation of the present invention is to take touch force into consideration. It may be considered in daily usage that the greater touch force on the touch screen, the faster the user desires the cursor to move. In one embodiment of the present invention, the controlling the movement of the cursor based on the touch force comprises: setting the movement velocity of the cursor in direct proportion to the touch force. In other words, the greater the touch force is, the faster the cursor moves; on the contrary, the smaller the touch force is, the more slowly the cursor moves. Those skilled in the art should understand that a location of the cursor is associated with an initial location, movement velocity and movement duration of the cursor. Hence, the controlling the movement velocity of the cursor based on the touch force results in determining a location of the cursor based on the touch force.

In one embodiment of the present invention, the calculating touch force of the touch comprises: calculating touch force of the touch based on feedback from a pressure sensor on the touch screen; and/or calculating touch force of the touch based on a contact area with the touch screen.

On some computing devices there is equipped a pressure sensor capable of measuring touch force of the user to the touch screen. Hence, in such computing devices touch force may be measured based on the pressure sensor, and subsequently the touch force is used as a parameter for controlling a movement rate of the cursor.

For most computing devices without a pressure sensor, the touch force of the touch may be calculated based on a contact area with the touch screen. It should be noted that the greater touch force of the user is, the larger the area where the finger is in contact with the surface of the touch screen; on the contrary, the smaller the touch force is, the smaller the area where the finger is in contact with the surface of the touch screen is. At this point, since a contact area of the touch can be obtained, the contact area may be used as a parameter for controlling the movement velocity of the cursor.

In one embodiment of the present invention, the touch force is in direct proportion to the contact area with the touch screen.

Figure 6:
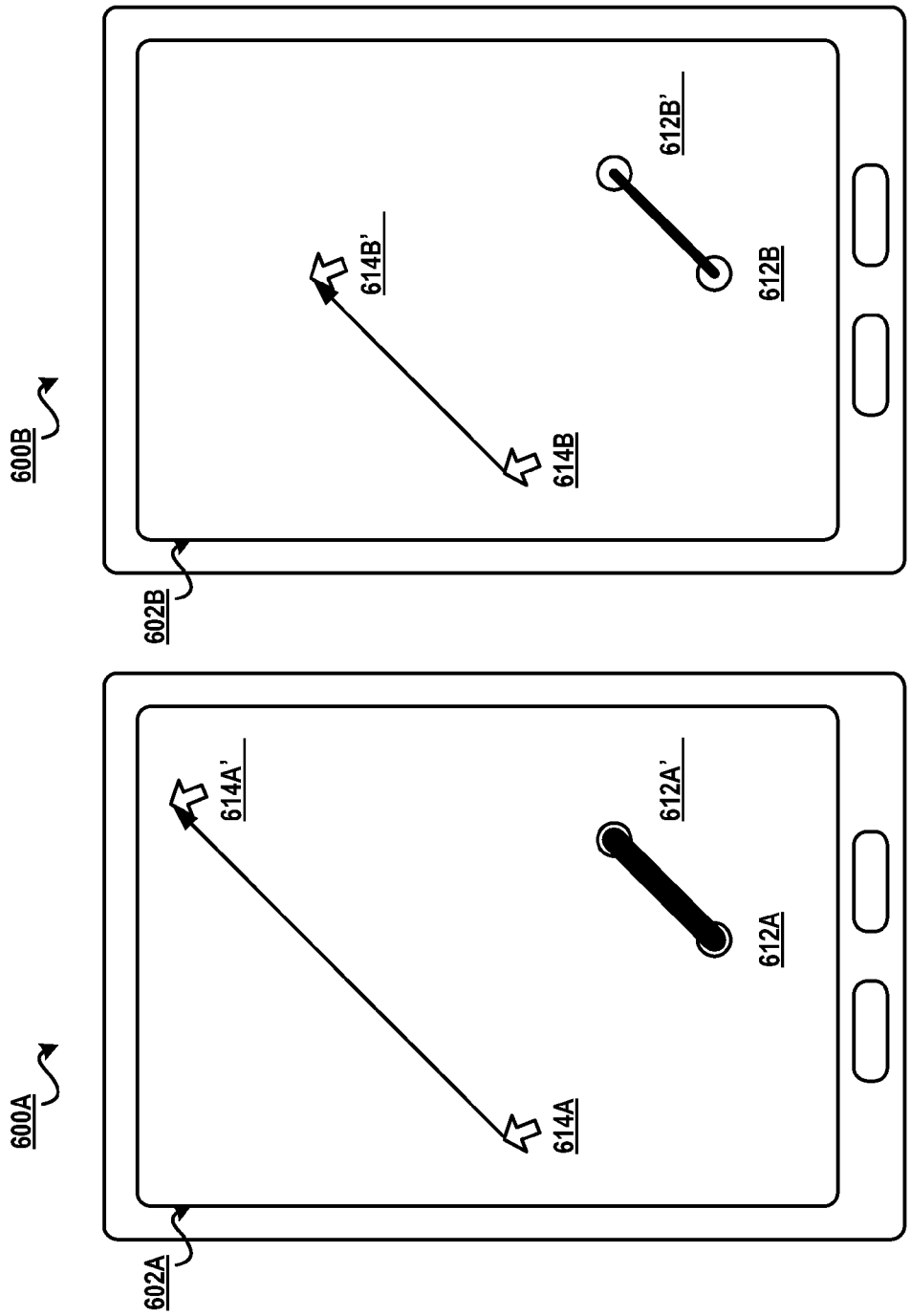
FIGS. 6A and 6B schematically illustrate a method for controlling a cursor on a touch screen according to other embodiments of the present invention, respectively.

FIGS. 6A and 6B schematically illustrate schematic views 600A and 600B of a method for controlling a cursor on a touch screen according to one embodiment of the present invention. These figures illustrate different movement tracks of the cursor on the touch screen when touching the surface of the touch screen by different touch force.

As illustrated in FIG. 6A, on a touch screen 602 there are illustrated a movement track 612A-612A' of the touch point of the user's finger/stylus, and a corresponding movement track 614A-614A' of the cursor. In addition, FIG. 6B illustrates a scenario similar to FIG. 6A; the difference is that the line of the movement track 612A-612A' of the touch point is relatively bold, which indicates greater touch force; and the line of the movement track 612B-612B' of the touch point is relatively light, which indicates smaller touch force. Corresponding to the magnitude of touch force, the movement track 614A-614A' of the cursor in FIG. 6A is longer, while the movement track 614B-614B' of the cursor in FIG. 6B is shorter. This means that the cursor in FIG. 6A, though moving in the same direction, moves faster than the cursor in FIG. 6B.

In one embodiment of the present invention, the determining a location of the cursor according to the movement velocity of the touch point of the touch comprises: setting a proportion factor to adjust a relationship between the location of the cursor and the movement velocity of the touch point.

By setting a proportion factor, the user may adjust a proportion relationship between the movement velocity of the cursor and the movement velocity of the touch point according to his/her own needs. For example, when the user is using a computing device with an oversize touch screen (e.g., 50 inches), a larger proportion factor may be set. Hence, the user may control the cursor to move within the whole screen simply by performing input in a small area (e.g., at the lower right corner) of the device instead of walking from one end to the other end of the device. When the user is using a smaller touch screen device (e.g., a mobile terminal), a smaller proportion factor may be set. When the user wishes to control the movement of the cursor with greater sensitivity, the proportion factor may be set as less than 1.

In one embodiment of the present invention, a location of the cursor is determined by the formula:

$$p_T = p_0 + \int_0^T a W_t S_t \vec{v}_t dt$$

Where $p_0$ represents a previous location of the cursor, a represents a proportion factor, $W_t$ represents feedback from the pressure sensor at moment t, $S_t$ represents a contact area with the touch screen at moment t, and $\vec{v}_t$ represents a movement velocity of the touch point to the touch screen at moment t.

The formula means that the location $p_T$ of the cursor at moment t equals a vector sum of the location $p_0$ at an initial moment "0" and a movement offset of the cursor under the control of the touch point. At this point, the offset of the cursor equals $\int_0^T a W_t S_t \vec{v}_t dt$.

At this point, a represents a proportion factor whose magnitude may be customized by the user according to his/her own needs. The larger a value, the more sensitive the control over the cursor of the movement by the user's finger/stylus; the smaller a value, the less sensitive the control. $W_t$ represents feedback from the pressure sensor at moment t, and $S_t$ represents a contact area with the touch screen at moment t. It should be noted that when the computing device has no pressure sensor, $W_t$ may be set as 1, at which point only touch force $S_t$ calculated based on the contact area may be considered. When the computing device has a pressure sensor, only feedback $W_t$ of the pressure sensor may be considered (at which point $S_t$ may be set as 1); or both feedback $W_t$ of the pressure sensor and the contact area $S_t$ may be considered at the same time. Generally the greater the touch force of the user's finger is, the larger the deformation of the finger is, and further, the larger the contact area with the touch screen is. Hence, feedback $W_t$ of the pressure sensor and the contact area $S_t$ usually vary in the same direction.

$\vec{v}_t$ represents a movement velocity of the touch point to the touch screen at moment t. Since a contact area of the touch point and a movement velocity of the touch point vary with time, the foregoing formula is integrated with respect to instantaneous values of the contact area and the movement velocity. When touch force is not considered, $S_t$ may be set as 1.

In one embodiment of the present invention, the cursor is not displayed on the touch screen in response to having exited the pointing mode. When having exited the pointing mode, an operating state of the touch screen is restored to the normal mode, at which point the cursor is not displayed but the input focus is the touch point of the user's finger/stylus.

In one embodiment of the present invention, wherein the exiting the pointing mode comprises exiting the pointing mode in response to one of: the track of the touch point satisfying a second predefined track; and pressing a second predefined button exiting the pointing mode.

The operation of exiting the pointing mode is similar to the above-described operation of entering the pointing mode. The difference is that in one embodiment it is possible to exit the pointing mode in response to the fact that the touch screen has not been touched for a predetermined period of time. The basis of using this exiting approach is that when the user has not touched the touch screen for an enough long time, in other words, the user has not changed a location of the cursor for an enough long time, it can be considered that the user has moved the cursor to a desired location. Hence, it is possible to exit the pointing mode after a predetermined period of time.

For example, the user may customize duration of the predetermined period of time, 1 minute, 2 minutes, etc.

Figure 7:
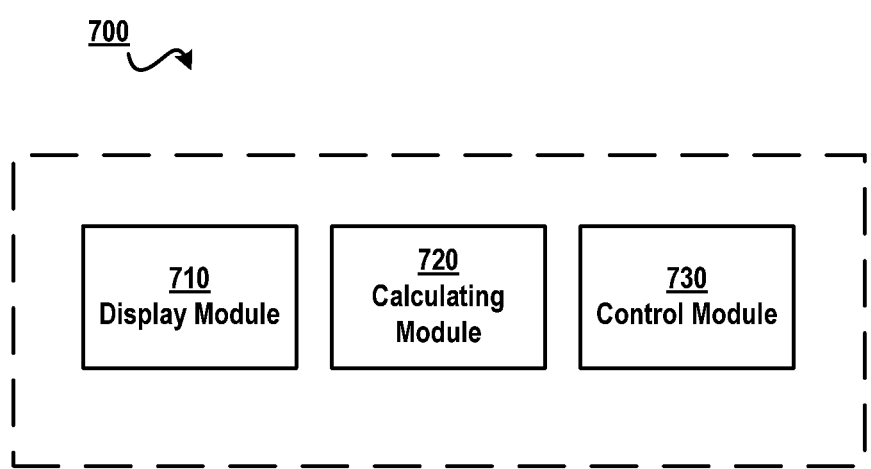
FIG. 7 schematically illustrates an apparatus for controlling a cursor on a touch screen according to one embodiment of the present invention.

In one embodiment of the present invention, there is provided an apparatus for controlling a cursor on a touch screen. FIG. 7 schematically illustrates a schematic view 700 of an apparatus for controlling a cursor on a touch screen according to one embodiment of the present invention. The apparatus comprises: a display module 710 configured to, in response to having entered a pointing mode, display the cursor on the touch screen; a calculating module 720 configured to, in response to a touch on the touch screen, calculate a movement velocity of a touch point of the touch; and a control module 730 configured to control the movement of the cursor according to the movement velocity of the touch point; wherein at any moment in the pointing mode, an input area of the touch point is any area within the touch screen.

In one embodiment of the present invention, the control module comprises: a determining module 730 configured to determine a location of the cursor according to the movement velocity of the touch point of the touch; and a refreshing module configured to refresh the cursor at the location.

In one embodiment of the present invention, there is further comprised a force module configured to calculate touch force of the touch; and a force control module configured to control the movement of the cursor based on the touch force.

In one embodiment of the present invention, the force control module comprises: a setting module configured to set the movement velocity of the cursor to be in direct proportion to the touch force.

In one embodiment of the present invention, the force module comprises: a first force module configured to calculate the touch force of the touch based on feedback from a pressure sensor on the touch screen; and/or a second force module configured to calculate the touch force based on a contact area with the touch screen.

In one embodiment of the present invention, the touch force is in direct proportion to the contact area with the touch screen.

In one embodiment of the present invention, the control module further comprises: a proportion module configured to set a proportion factor to adjust a relationship between the location of the cursor and the movement velocity of the touch point.

In one embodiment of the present invention, the proportion module determines the location of the cursor by using the formula below:

$$p_T = p_0 + \int_0^T a W_t S_t \vec{v}_t \, dt$$

Where $p_0$ represents a previous location of the cursor, a represents the proportion factor, $W_t$ represents the feedback from the pressure sensor at moment t, $S_t$ represents the contact area with the touch screen at moment t, and $\vec{v}_t$ represents the movement velocity of the touch point to the touch screen at moment t.

In one embodiment of the present invention, there is further comprised a click module configured to, in response to having clicked on the touch screen, activate an item which is displayed on the touch screen and at which the cursor is pointed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for controlling a cursor on a touch screen, the method comprising:
   in response to having entered a pointing mode, displaying the cursor on the touch screen;
   in response to a touch on the touch screen, calculating a movement velocity of a touch point of the touch, and calculating a touch force of the touch based on one or more of: feedback from a pressure sensor on the touch screen, and a contact area with the touch screen, wherein the touch force is in direct proportion to the contact area with the touch screen; and
   controlling the movement of the cursor according to the movement velocity of the touch point, and also controlling the movement of the cursor based on the touch force by setting the movement velocity of the cursor to be in direct proportion to the touch force;
   wherein the controlling the movement of the cursor according to the movement velocity of the touch point comprises determining a location of the cursor according to the movement velocity of the touch point of the touch, refreshing the cursor at the location, and setting a proportion factor to adjust a relationship between the location of the cursor and the movement velocity of the touch point, such that the location of the cursor is determined using the formula:

$$p_T = p_0 + \int_0^T a W_t S_t \vec{v}_t \, dt$$

where $p_0$ represents a previous location of the cursor, a represents the proportion factor, $W_t$ represents the feedback from the pressure sensor at moment t, $S_t$ represents the contact area with the touch screen at moment t, and $\vec{v}_t$ represents the movement velocity of the touch point to the touch screen at moment t; and
   wherein at any moment in the pointing mode, an input area of the touch point is any area within the touch screen.

2. The method according to claim 1, further comprising:
   in response to having clicked on the touch screen, activating an item which is displayed on the touch screen and at which the cursor points.

* * * * *